United States Patent [19]

Kitahara et al.

[11] Patent Number: 5,514,856
[45] Date of Patent: *May 7, 1996

[54] HYBRID CARD HAVING IC CHIP AND OPTICAL/MAGNETIC RECORDING REGION THEREON

[75] Inventors: Toshihiro Kitahara; Toshio Horiguchi, both of Tokyo, Japan

[73] Assignee: Olympus Optical Co., Ltd., Tokyo, Japan

[*] Notice: The term of this patent shall not extend beyond the expiration date of Pat. No. 5,332,890.

[21] Appl. No.: 205,846

[22] Filed: Mar. 3, 1994

Related U.S. Application Data

[62] Division of Ser. No. 923,213, Jul. 30, 1992, Pat. No. 5,332,890.

[30] Foreign Application Priority Data

Aug. 8, 1991 [JP] Japan ........................... 3-199591
Sep. 24, 1991 [JP] Japan ........................... 3-243463

[51] Int. Cl.$^6$ ........................... G06K 7/00; G06K 7/10; G06K 19/06
[52] U.S. Cl. ........................... 235/440; 235/492; 235/454
[58] Field of Search ........................... 235/487, 492, 235/440, 454, 475; 902/26

[56] References Cited

U.S. PATENT DOCUMENTS

| | | | |
|---|---|---|---|
| 4,794,243 | 12/1988 | Hamada | 235/492 |
| 4,990,758 | 2/1991 | Shibano et al. | |
| 5,130,521 | 7/1992 | Shino et al. | |
| 5,179,267 | 1/1993 | Hashimoto et al. | |
| 5,185,798 | 2/1993 | Hamada et al. | 235/382 |
| 5,317,138 | 5/1994 | Togawa | 235/440 |
| 5,332,890 | 7/1994 | Kitahara | 235/440 |

FOREIGN PATENT DOCUMENTS

| | | | |
|---|---|---|---|
| 0138219 | 4/1985 | European Pat. Off. | |
| 0147337 | 7/1985 | European Pat. Off. | |
| 0230069 | 7/1987 | European Pat. Off. | |
| 0269387 | 6/1988 | European Pat. Off. | |
| 0492358A1 | 7/1992 | European Pat. Off. | |
| 60-84686 | 5/1985 | Japan | |
| 61-103287 | 5/1986 | Japan | |
| 62-06390 | 1/1987 | Japan | 235/487 |
| 62-280991 | 12/1987 | Japan | |
| 63-78798 | 4/1988 | Japan | |
| 64-76291 | 3/1989 | Japan | |
| 2-144686 | 6/1990 | Japan | |
| 1546053 | 5/1979 | United Kingdom | |
| 85/03587 | 8/1985 | WIPO | 235/454 |

*Primary Examiner*—Donald T. Hajec
*Assistant Examiner*—Thien Minh Le
*Attorney, Agent, or Firm*—Frishauf, Holtz, Goodman, Langer & Chick

[57] ABSTRACT

A hybrid card comprises a substrate carrying an IC chip. An IC terminal is electrically connected to the IC chip and is arranged on a first surface of the substrate. A contact region is defined around the IC terminal and is occupied when a contact terminal of a recording/reproducing apparatus electrically contacts the IC terminal. An optical recording region has a plurality of tracks extending parallel to each other on the first surface. The contact region and the optical recording region are spaced apart in a direction parallel to the tracks.

8 Claims, 17 Drawing Sheets

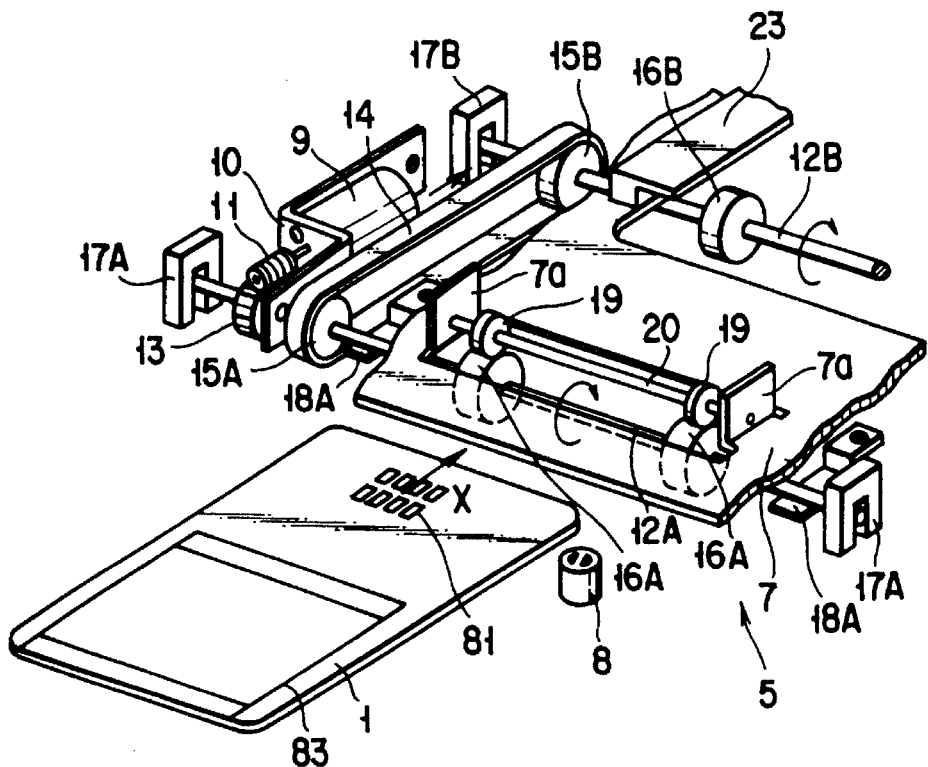
F I G. 5
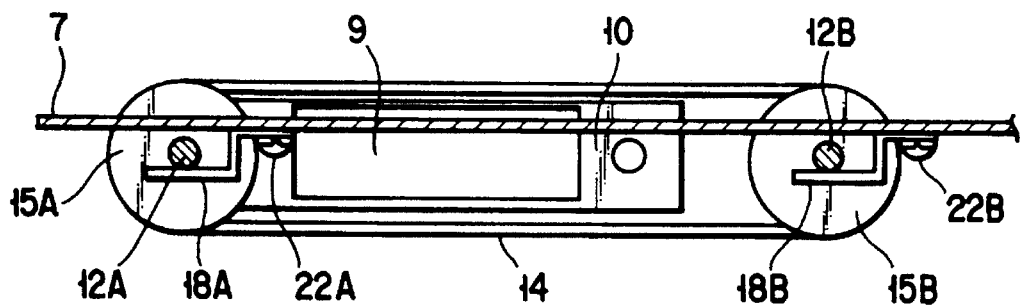
F I G. 6

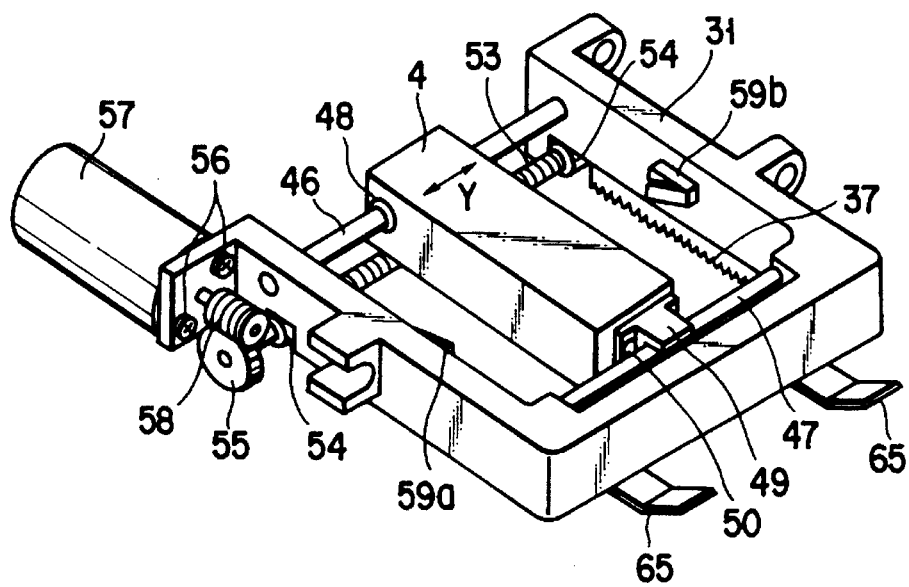
F I G. 8
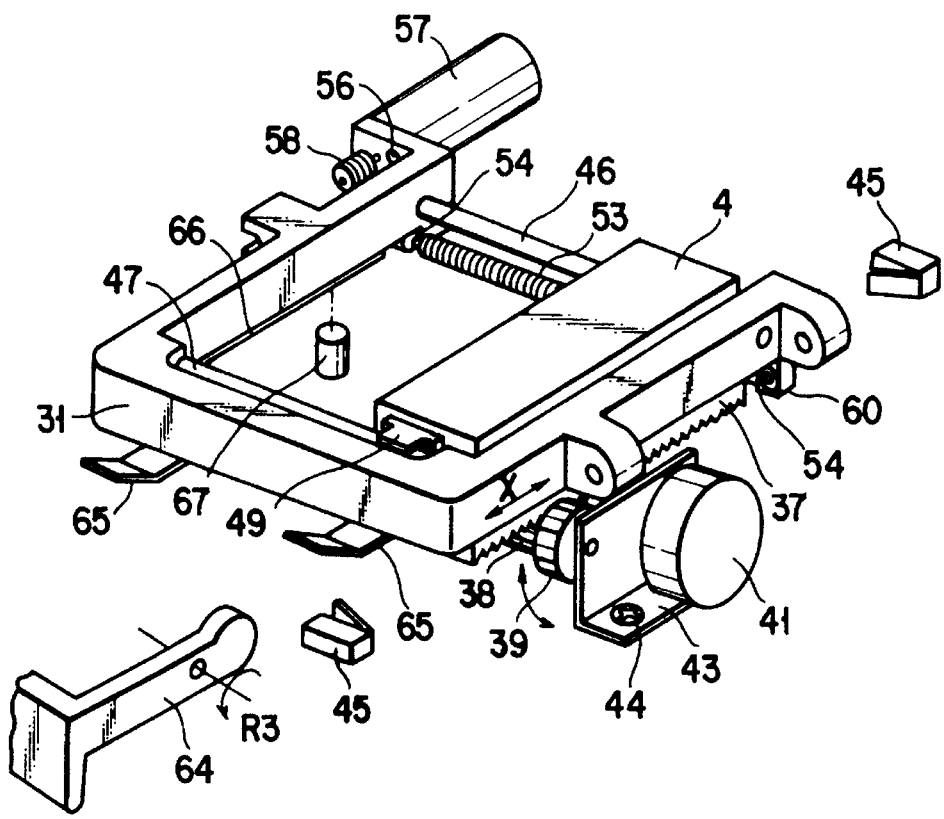
F I G. 9

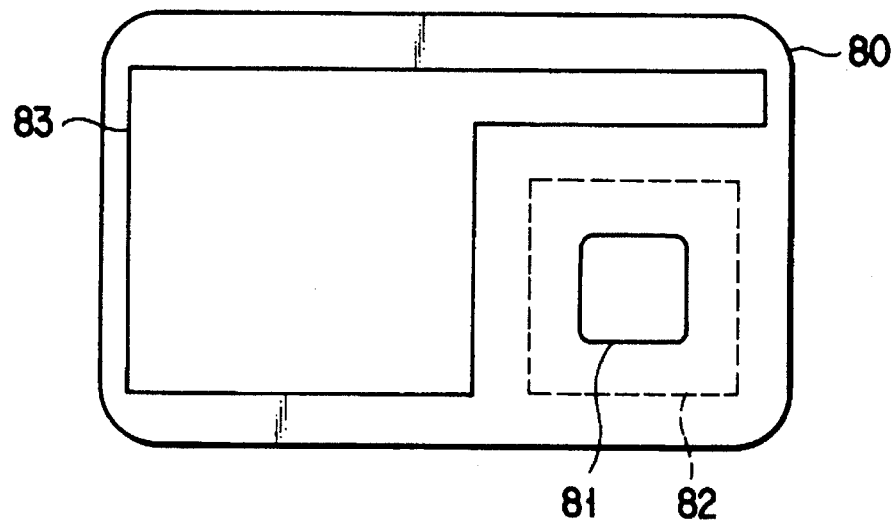
F I G. 16
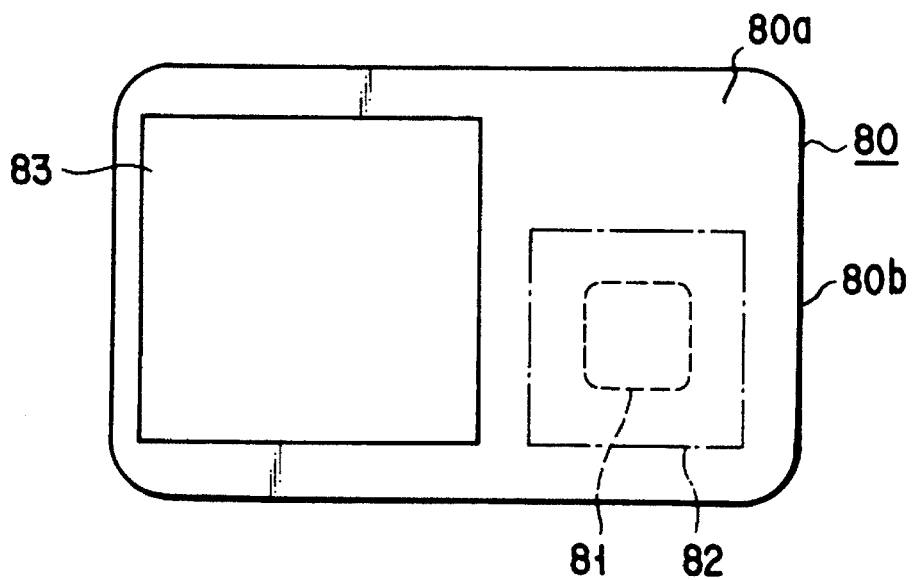
F I G. 17

HYBRID CARD HAVING IC CHIP AND OPTICAL/MAGNETIC RECORDING REGION THEREON

This is a division of application Ser. No. 07/923,213 filed Jul. 30, 1992, now U.S. Pat. No. 5,332,890 issued Jul. 20, 1994.

BACKGROUND OF THE INVENTION

1. Field of the Invention

The present invention relates to a hybrid card having an optical recording/magnetic recording region and an IC chip in its substrate, and to a recording/reproducing apparatus for recording/reproducing information to/from the hybrid card.

2. Description of the Related Art

In recent years, information industries have been rapidly developed, and an amount of information to be dealt in has been increased. Due to this, IC cards, which can portably hold a large amount of information, and optical cards, may be in great demand as compared with magnetic cards, which are already widely used.

FIG. 19 shows a conventional apparatus for recording/reproducing data to/from the optical card. In this apparatus, a wire 216 is wound around the portion between two pulleys 210 and 215, and a wire 217 is wound around the portion between two pulleys 211 and 215. By these two wires 216 and 217, power of a motor 208 is transmitted to a moving guide member 206, and the moving guide member 206 is moved in a Y direction. In the moving guide member 206, a step motor 220 is provided, and power of the step motor 220 is transmitted to an optical head 218 by a wire 224 wound around the portion between pulleys 222 and 223. In this case, since the optical head 218 must be moved over the entire length of an optical card 202, it is difficult to miniaturize the apparatus.

The recording/reproducing apparatus for the optical card normally has a shuttle on which the optical card is mounted. The shuttle is reciprocated to an optical head and data recording/reproducing is performed. In the shuttle, a function of correcting a warp in the optical card is needed. Similar to the other cards, the optical card is easily warped since the card is put in a wallet or a commutation-ticket holder in carrying.

However, when the card is inserted into the shuttle and ejected from the shuttle, the warp correcting function works as resistance, and this causes an increase in load on the motor and abrasion of the card. Due to this, there is required the structure in which the warp correcting function is released at the time of the card insertion and ejection.

A shuttle having such a structure is disclosed in, for example, Published Unexamined Japanese Patent Application No. 2-144686.

Regarding the IC card, an IC terminal provided in the card and a contact terminal provided in the apparatus are brought into contact with each other to perform data recording/reproducing to/from the IC chip. For example, in an apparatus disclosed in Published Unexamined Japanese Patent Application No. 64-76291, when the card is inserted into the apparatus, the contact terminal of the apparatus contacts the IC terminal of the card. Then, when the card is ejected from the apparatus, the contact terminal of the apparatus is spaced from the IC terminal.

The above-mentioned optical card and IC card have merits and demerits, respectively. For example:

(1) The magnetic card can be manufactured at low cost and data can be erased. However, the recording capacity is small;

(2) The IC card can be accessed at high speed, and the transferring rate is fast. However, the manufacturing cost is high per bit. Also, the IC chip included in the IC card is weak against static electricity; and (3) The optical card has a large recording capacity, and the manufacturing cost is low per bit. However, data cannot be rewritten.

In order to compensate for the above-mentioned demerits, a complex type card (hereinafter called a hybrid card) has been proposed, and this type of card is expected to make use of a new application.

FIGS. 20 and 21 show two examples of the hybrid card. In these examples, the outline of the card has the same size as the ordinary credit card. In the hybrid card of FIG. 20, an optical recording region 102 and an IC terminal 103 are formed on the same plane. In the hybrid card of FIG. 21, they are formed on different surfaces respectively.

In using the data recording card, it is easy to deal with the card if a plurality of data recording sections, which are the important part, are formed on the same plane. Also, it can be considered that the disadvantages such as a flaw in the data recording section and breakage of the data recording section lessen.

FIGS. 22 and 23 show a recording/reproducing apparatus for a hybrid card 121 having a shuttle. In a shuttle 104 on which the hybrid card 121 is mounted, a card base 105 is provided. On the surface of the card base 105, there are provided pressing members 106a and 106b pressing the portions other than an optical recording region 102 of the hybrid card 121. A push-up member 109 having a lever 108 at its one end is provided on the upper surface of the card base 105 and is supported by an elastic member 107. Two elastic members 110a and 110b are provided on one side surface of the card base 105. The push-up member 109 is pressed against the lower surfaces of the pressing members 106a and 106b. Also, the hybrid card 121 is pressed onto the other side surface of the card base 105 by the elastic members 110a and 110b. Thereby, the width direction of the card is positioned.

Moreover, a contact terminal 111 is provided in the pressing member 106a. The contact terminal 111 is arranged at the portion where the contact terminal 111 contacts an IC chip 103 on the card when the hybrid card 121 is sandwiched between the pressing members 106a and 106b. The lever 108 is pressed down by a pin 112. The pin 112 is driven by driving means (not shown). The lever 108 is displaced together with the push-up member 109 by the force of the elastic member 107.

At the time when the hybrid card 121 is inserted to the shuttle 104, the pin 112 is moved down by driving means (not shown), and the lever 108 and the push-up member 109 are pressed down against force of the elastic member 107. Under this state, rubber rollers 113a and 113b are rotatated. By this operation, the hybrid card 121 is sandwiched by the pressing members 106a, 106b and the push-up member 109, and the mounting state as shown in FIG. 23 can be obtained.

In this state, the IC chip 103 always contacts the contact terminal 111, and data can be recorded/reproduced to/from the IC chip 103. For recording/reproducing data to/from the recording region 102, the shuttle 104 is reciprocated along the longitudinal direction (X direction) of the hybrid card 121. The position of the light spot, which is irradiated from an object lens 123 of an optical head 122, is scanned by the reciprocating motion, whereby the recording/reproducing is performed in the optical recording region 102.

According to the above apparatus, since the contact terminal 111 is provided in the shuttle 104, the space for providing the contact terminal 111 must be ensured on the shuttle 104 to the hybrid card 101 shown in FIGS. 20 and 21. Moreover, this causes the weight of the shuttle 104 to be increased. Since the shuttle 104 is reciprocated together with the hybrid card when the hybrid card is recorded/reproduced, the increase in weight becomes a big problem.

Moreover, a cable 120 such as an FPC (Flexible Printed Circuit cable), which is used for the power supply to the IC chip 103 and data transmitting and receiving to the main body of the apparatus, must be extended from the shuttle 104 reciprocating in the direction of an arrow X to the side of the main body of the apparatus. Due to this, attention must be paid to durability of the cable 120, and a space for pulling about the cable 120 in the apparatus must be ensured.

Furthermore, the IC chip 103 of the hybrid card 121 and the contact terminal 111 reciprocate together with the shuttle 104 at the time of recording/reproducing to/from the recording region 102. Due to this, the IC chip 103 and the contact terminal 111 may be shifted during the reciprocating motion. Therefore, reliability of the recording/reproducing of the IC chip 103 becomes low.

On the other hand, in the case of the above-structured hybrid card 121, the optical recording region 102 must be formed in a region other than a predetermined region surrounding the IC chip 103. Also, the contact terminal 111 must be provided at the data position of the hybrid card 121 on the shuttle 104. Due to this, the arrangements of the optical head 122 and of the contact terminal 111 are largely restricted and the size in the height direction of the apparatus is increased, in order to prevent interference with the contact terminal 111 and the optical head 122.

SUMMARY OF THE INVENTION

An object of the present invention is to provide a hybrid card having high reliability in a recording and reproducing and a recording/reproducing apparatus, and wherein the hybrid card can be miniaturized.

According to the present invention, there is provided a hybrid card comprising a substrate having a first surface and a second surface opposite to the first surface, an IC chip carried by in the substrate, at least one IC terminal electrically connected to the IC chip and arranged on one of the first and second surfaces, and an optical/magnetic recording region having a plurality of tracks extending parallel to each other on one of the first and second surfaces, wherein the IC terminal and at least one part of the optical/magnetic recording region are spaced along the extending direction of the tracks.

Moreover, according to the present invention, there is provided a recording/reproducing apparatus for a hybrid card, the hybrid card comprising a substrate having a first surface and a second surface opposite to the first surface, an IC chip carried by in the substrate, at least one IC terminal electrically connected to the IC chip and arranged on one of the first and second surfaces, and an optical/magnetic recording region having a plurality of tracks extending parallel to each other on one of the first and second surfaces, the apparatus comprising at least one contact terminal electrically contacting the IC terminal, a head for recording/reproducing information to/from the optical/magnetic recording region, and means for relatively moving the head and the hybrid card, wherein moving means relatively moves the head and the hybrid card in parallel and perpendicular directions to the tracks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a perspective view showing a loading mechanism of the apparatus of FIG. 4;

FIG. 6 is a side view, which is partially broken, showing the loading mechanism of FIG. 5;

FIG. 8 is a perspective view showing a moving mechanism in a Y direction;

FIG. 9 is a perspective view showing a moving mechanism in an X direction;

FIG. 16 is a plan view showing a first modification of the hybrid card;

FIG. 17 is a plan view showing a second modification of the hybrid card;

DETAILED DESCRIPTION OF THE PREFERRED EMBODIMENT

A hybrid card and its recording/reproducing apparatus relating to one embodiment of the present invention will be explained with reference to FIGS. 1 to 13.

Figure 1:
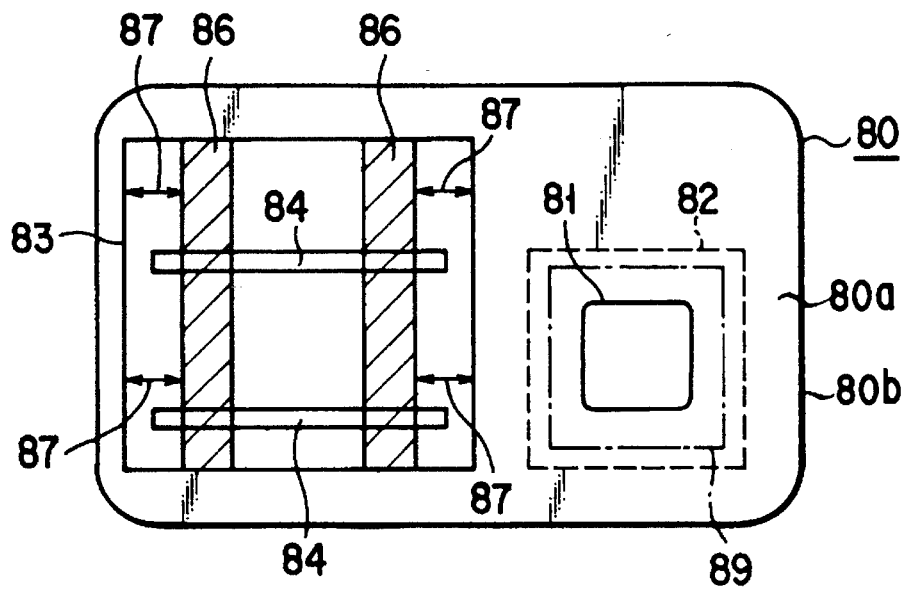
FIG. 1 is a plan view showing a hybrid card relating to a preferred embodiment of the present invention.

In FIG. 1, reference numeral 80 denotes a rectangular card substrate. The card substrate 80 has a first surface (first side) 80a and a second surface (second side) 80b opposite to the first surface 80a. The hybrid card in this embodiment has both an IC terminal 81 and an optical medium 83 on the first surface 80a.

Figure 3:
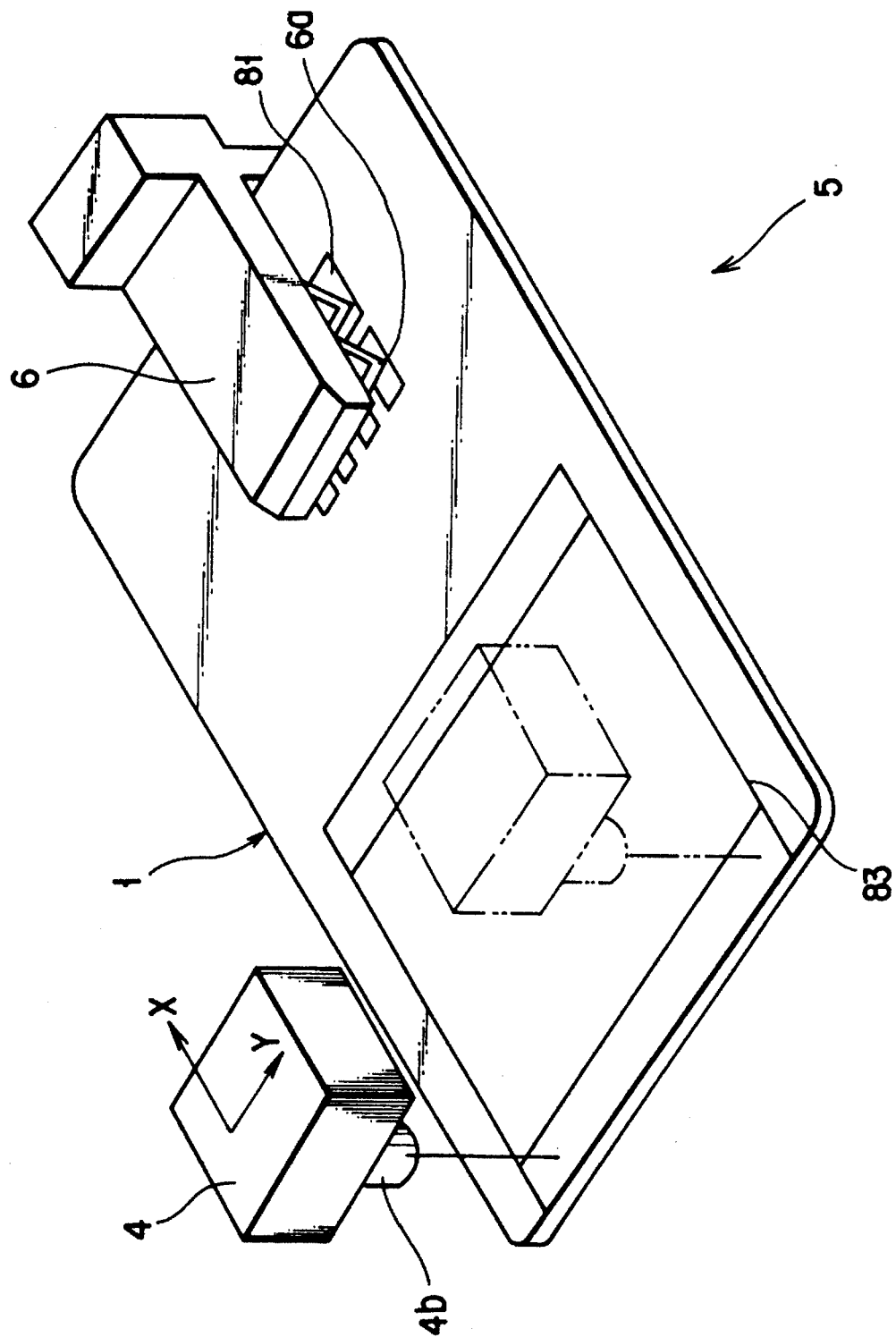
FIG. 3 is a perspective view showing the outline of a recording/reproducing apparatus for a hybrid card relating to the embodiment of the present invention.

An IC chip 89 is mounted in the card substrate 80, and the IC terminal 81, which is electrically connected to the IC chip, is formed so as to be exposed on the surface of the card substrate 80. The position of the IC terminal 81 on the card substrate 80 is determined by an ISO standard, and corresponds to the lower right portion of the card substrate 80 of FIG. 1. As shown in FIG. 3, a contact terminal 6a, which writes/reads information of the IC chip; electrically contacts the IC terminal 81. Reference numeral 6 denotes a contact region, which is a region placed at the upper portion of the card substrate 80 occupied when the contact terminal 6a contacts the IC terminal 81.

As shown in FIG. 1, the optical medium 83, serving as an optical recording region, is located at the left side of a contact region 82. The optical medium 83 extends along a width direction of the card substrate 80 in a state that a predetermined space is left, and extends in a range that the optical medium 83 does not reach the contact region 82 in a longitudinal direction of the card substrate 80. As a result, the optical medium 83 is spaced from the IC terminal 81 along the longitudinal direction of the card substrate 80.

Figure 2:
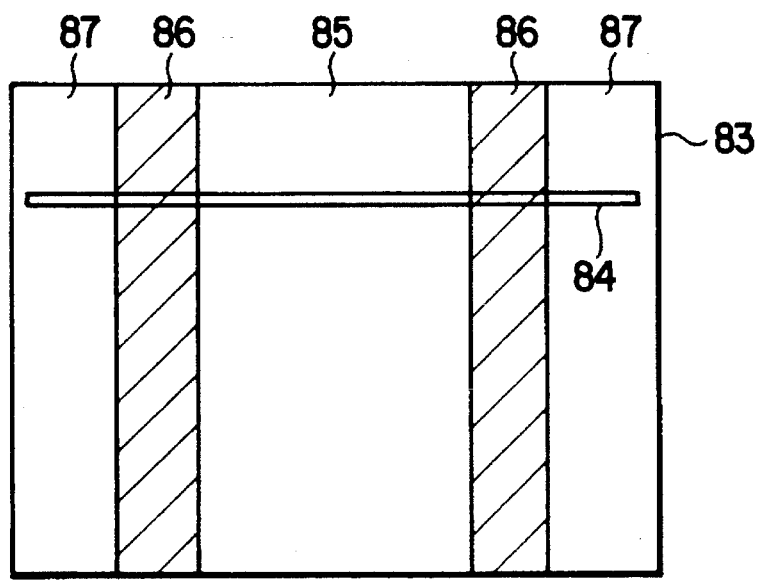
FIG. 2 is an enlarged plan view of an optical recording region of the hybrid card of FIG. 1.

As shown in FIG. 2, a plurality of recording tracks 84, which extend in the longitudinal direction of the card substrate 80, are formed in the optical medium 83. In FIG. 2, only one recording track is shown so as to simplify the drawing.

These recording tracks 84 comprise a data section 85, ID sections 86, and margin sections 87. The data section 85 is placed at substantially the central position of the recording track, and information is written in the data section 85. The ID sections 86 are provided in both end portions of the data section 85, respectively, and information such as an address number of the track is recorded in the ID sections 86 in advance. The margin sections 87 are placed at both end portions of the recording track 84. The light spot for reading information is controlled to scan the recording track 84 in a range where the light spot is prevented from not only exceeding the margin section 87 but also extending to the outside of the card.

Unlike the conventional recording/reproducing apparatus, according to the recording/reproducing apparatus of this embodiment, the hybrid card is not reciprocated along the longitudinal direction. As shown in FIG. 3, an optical head 4 is moved along X and Y-directions relative to the hybrid card 1 (longitudinal direction of the hybrid card 1 and the width direction, respectively), and information is recorded/reproduced to/from the optical medium 83.

The information recording/reproducing to the IC chip is performed in that the contact terminal 6a electrically contacts the IC terminal 81. This contact is always performed when the hybrid card 1 is placed at a predetermined position.

As shown in FIG. 5, a sensor 8 is fixed to a frame 7 of a recording/reproducing apparatus 5. The sensor 8 is arranged at the lower portion of a transferring passage of the hybrid card 1, and is formed as a reflection type sensor (a sensor of transmission type may be used).

The sensor 8 is electrically connected to a loading motor 9 via a controller (not shown). The motor 9 is fixed to a motor plate 10 by a screw. A worm gear 11 is attached to a driving shaft of the motor 9. The worm gear 11 is engaged with a gear 13. The gear 13 is attached to a shaft 12A by screwing or pressing.

The shaft 12A is inserted into the hole formed in the motor plate 10 to have minimum play therein. Thereby, the distance between the worm gear 11 and the gear 13 in the shaft can be maintained constant. A pulley 15A is attached to the shaft 12A by screwing or pressing. Moreover, a pair of loading rollers 16A, are formed of rubber such as neoprene EPDM, (ethylene-propylene diene monomer) having good wear and abrasion resistance, which is thermally deposited or bonded to the shaft 12A.

Both end portions of the shaft 17A are guided in a vertical direction by two guides 17A. These guides 17A are formed of resin having good sliding property such as PTFE (polytetrafluoroethylene) POM,and secured to the frame 7. The guides 17A perform the restriction of the upper movement of the shaft 12A. The shaft 12A is urged upward by two springs 18A. Thereby, loading rollers 16A are pressed by rollers 19 provided in the upper portions of the loading rollers 16A.

Two rollers 19 are provided to be freely rotatable on a shaft 20. The shaft 20 extends in parallel to the shaft 12A, and is fixed to two stand-up portions 7a. These stand-up portions 7a are formed in the frame 7.

Each roller 19 is prevented from being shifted in the axial direction of the shaft 20 by an E-ring (not shown), and positioned just above each loading roller 16A.

As shown in FIG. 5, a shaft 12B, which extends in parallel to the shaft 12A, is arranged on the side of the inner direction of the shaft 12A. A pulley 15B is attached to the shaft 12B by screwing or pressing. A belt 14 is wound around the pulleys 15A and 15B. Power of the loading motor 9 is transmitted to the shaft 12B via the pulleys 15A and 15B, and the belt 14. Moreover, two transferring rollers, are formed of rubber such as neoprene and EPDM having good wear and abrasion resistance, which is thermally deposited or bonded to the shaft 12B.

Figure 4:
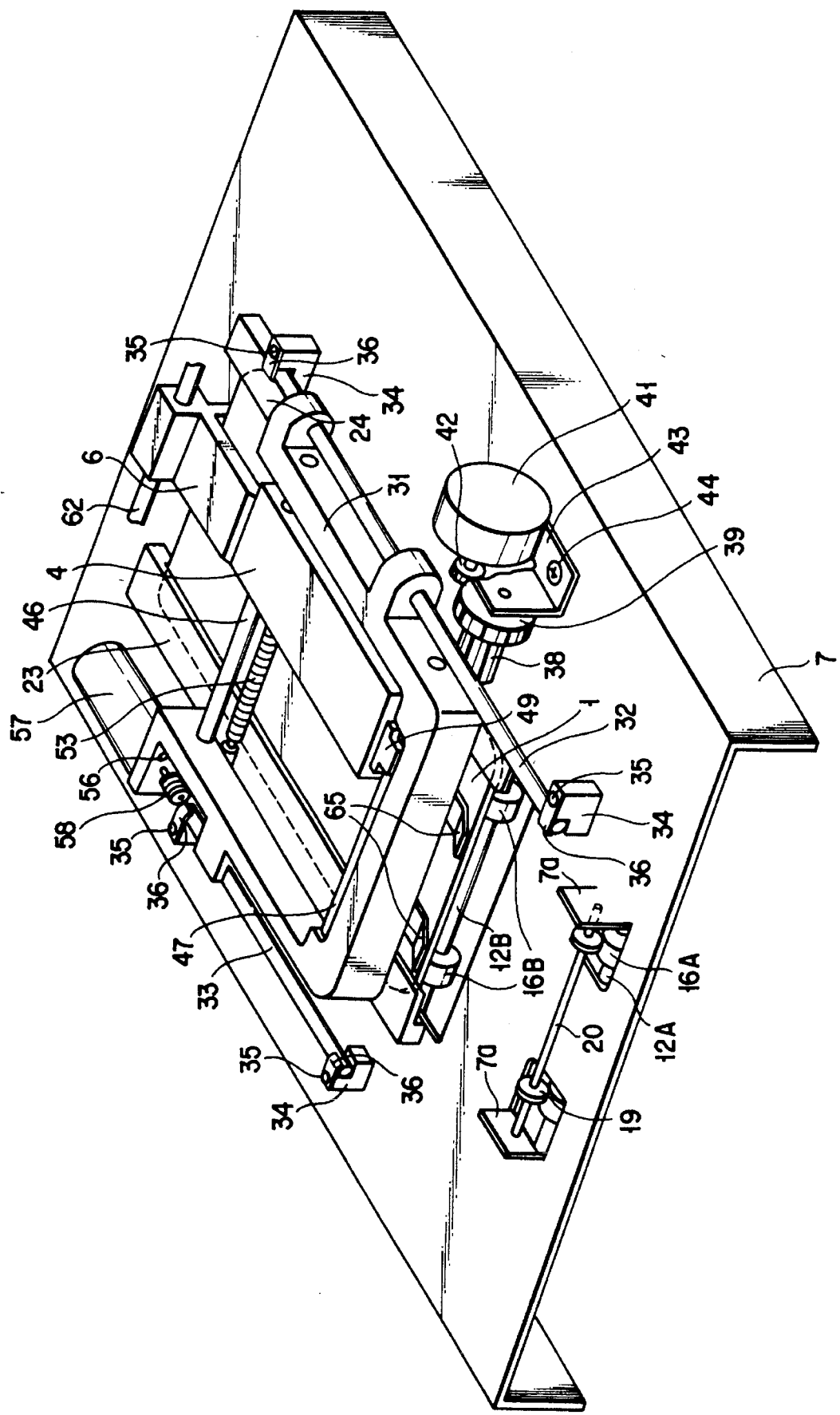
FIG. 4 is a perspective view showing the structure of the inside of the apparatus of FIG. 3.

Both end portions of the shaft 12B are guided in a vertical direction by two guides 17B. These guides 17B are formed of resin having good sliding property such as PTFE, POM, and secured to the frame 7. The guides 17B perform the restriction of the upper movement of the shaft 12B. As shown in FIGS. 4 and 6, the shaft 12B is urged to guides 23 and 24 by two springs 18b. The guides 23 and 24 are disposed above the shaft 12B.

Figure 7:
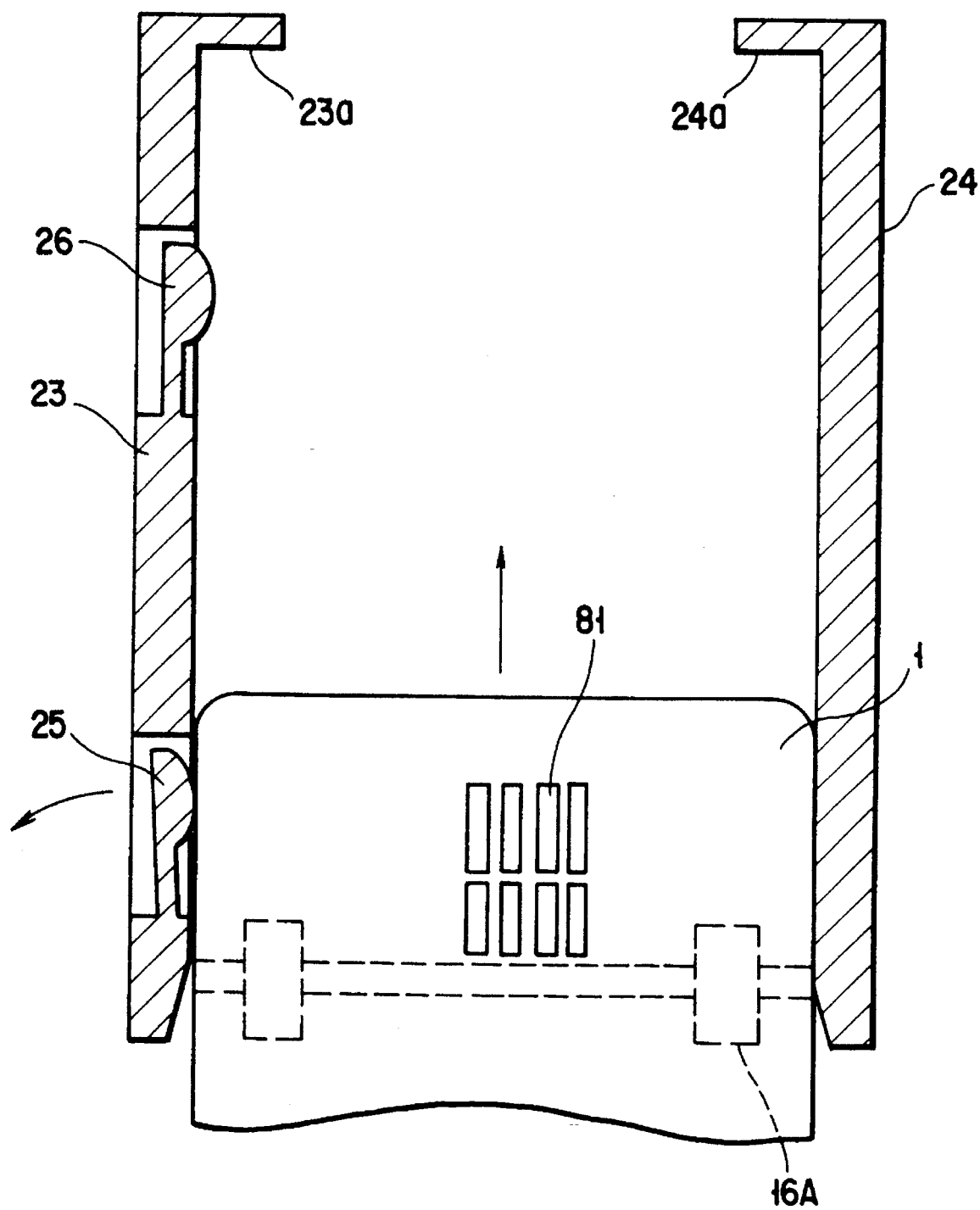
FIG. 7 is a plan view, which is partially broken, showing a guide of the apparatus of FIG. 4.

As shown in FIG. 7, the guides 23 and 24 are spaced from each other by the width of the hybrid card 1. These two guides 23 and 24 form a guide mechanism for guiding the hybrid card to the mounting position to be explained later. These guides 23 and 24 are formed of thermoplastic resin such as PTFE, POM having good sliding property and good elasticity. One end portion of each of guides 23 and 24 (lower portion in the drawing) is cut in a tapered manner, so that the hybrid card 1 can be smoothly guided. Moreover, stoppers 23a and 24a, which project in an L-shaped manner, are formed in the other end portion of each of guides 23 and 24 (upper portion in the drawing). In this embodiment, the position of the hybrid card at the time when the top end portion of the hybrid card 1 contacts the stoppers 23a and 24a is called a "mounting position." In FIG. 4, the hybrid card 1 is placed at the mounting position.

As shown in FIG. 7, first and second pressing levers 25 and 26 are integrally formed in the guide 23. The end portions of the pressing levers 25 and 26 project into the transferring passage of the hybrid card 1. The pressing levers 25 and 26 press and urge the hybrid card 1 to move in a direction of the guide 24 serving as a standard, so that the hybrid card 1 is pressed onto the guide 24. The hybrid card 1 is transferred in the above-mentioned manner, and is brought into contact with the stoppers 23a and 24a. Thereby, the hybrid card is positioned at the mounting position.

As shown in FIG. 4, the optical head 4 is arranged over the hybrid card 1 being mounted at the mounting position. The optical head 4 has a housing which is made of thermoplastic resin such as polycarbonate, ABS, or die-cast aluminum. In the housing, optical elements such as an actuator 4a, an objective lens 4b, an LED for lighting (not shown), and an LD for recording (not shown) are arranged.

The optical head 4 is arranged on a U-shaped moving base 31 forming a head moving means. The moving base 31 is supported by a reference shaft 32 and a guide shaft 33 to be movable along the longitudinal direction of the hybrid card 1.

Four shaft bases 34 are secured onto the frame 7. These shaft bases 34 are cut to be L-shaped. The end portions of the respective shafts 32 and 33 are formed at the cutting portions. A stopping member 36 is fixed to the shaft 34 by a screw 35, so that the end portions of the shafts 32 and 33 are secured.

As shown in FIGS. 8 and 9, a rack 37 is provided on the lower surface of the moving base 31. The rack 37 is engaged with a pinion 38. The pinion 38 is coaxially secured to a gear 39. As shown in FIG. 4, the gear 39 is engaged with a gear 42 fixed to the driving shaft of a motor 41. The motor 41 is secured to a motor plate 43. The motor plate 43 is fixed to the frame 7 by a screw 44.

As shown in FIG. 9, two limit switches 45 are provided at both ends of the driving region of the moving base 31 so as to control the movement of the base 31.

As shown in FIG. 8, a reference shaft 46 and a guide shaft 47 are pressed or screwed to the both end portions of the U-shaped moving base 31. The reference shaft 46 also works to improve rigidity of the U-shaped moving base 31.

A bearing 48 is provided at one end of the optical head 4. The reference shaft 46 is inserted into the bearing 48. A guide 49 is attached to the other end of the optical head 4 by a screw 50. The guide 49 is formed of a resin having good sliding property such as PTFE, POM. The guide shaft 47 is inserted into the guide 49.

Figure 12A:
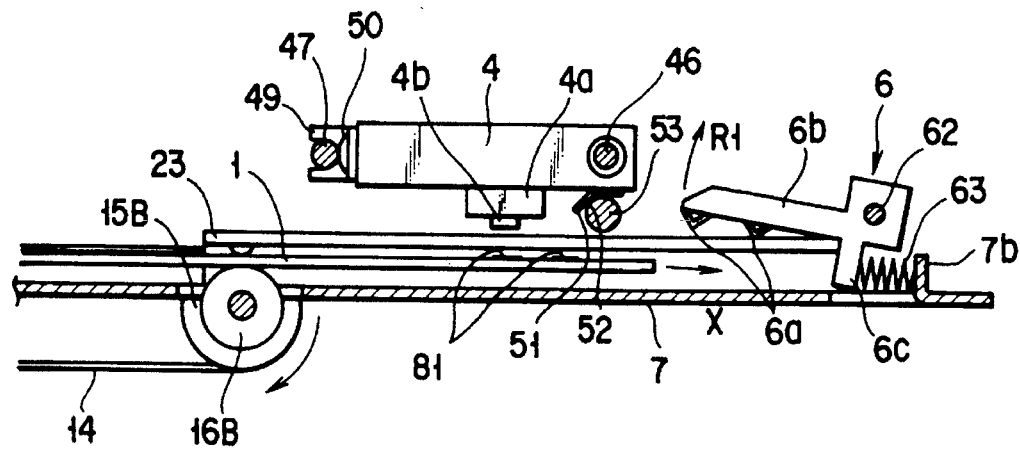
FIGS. 12A and 12B are side views, which are partially broken, explaining an operation of a contact terminal contacting an IC terminal.
Figure 12B:
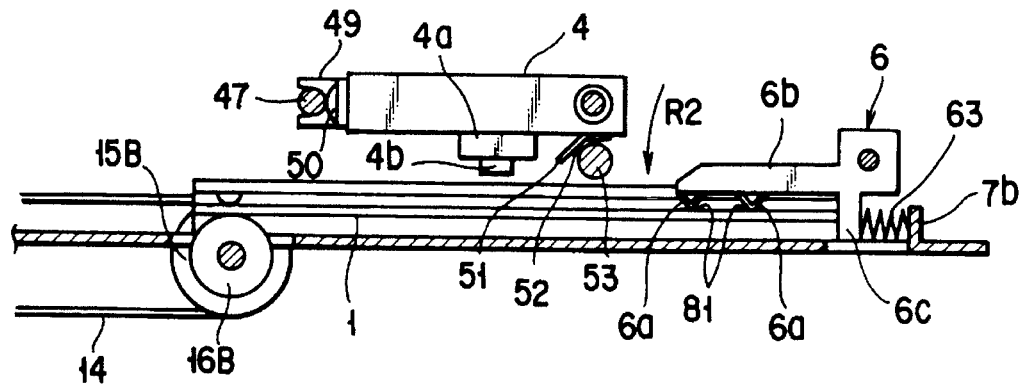

As shown in FIGS. 12A and 12B, a plate spring 51 is attached to the lower surface of the optical head 4. A pin 52, which is formed of a resin having good sliding property such as PTFE, POM, is secured to the top end portion of the plate spring 51. The pin 52 is engaged with a screw section of a lead screw 53. In accordance with the rotation of the lead screw 53, the optical head 4 moved in a Y direction shown in FIG. 8.

Bearings 54 are attached to both ends portions of the lead screw 53. These bearings 54 are secured to the moving base 31 by a stopping member 60 as shown in FIG. 9. Thereby, the lead screw 53 is rotatably attached to the moving base 31. As shown in FIG. 8, a gear 55 is attached to one end of the lead screw 53, and engaged with a worm gear 58. The worm gear 58 is attached to the output shaft of a motor 57 for the optical head. The motor 57 is attached to the moving base 31 by a screw 56. Power of the motor 57 is transmitted to the lead screw 53 via the worm gear 58 and the gear 55, so that the optical head 4 is moved in the Y direction.

Two switches 59a and 59b are provided on the opposed inner surfaces of the moving base 31. The switches 59a and 59b serve as limit sensors for preventing the moving base 31 from exceeding the moving range of the Y direction in the optical head 4.

Figure 10:
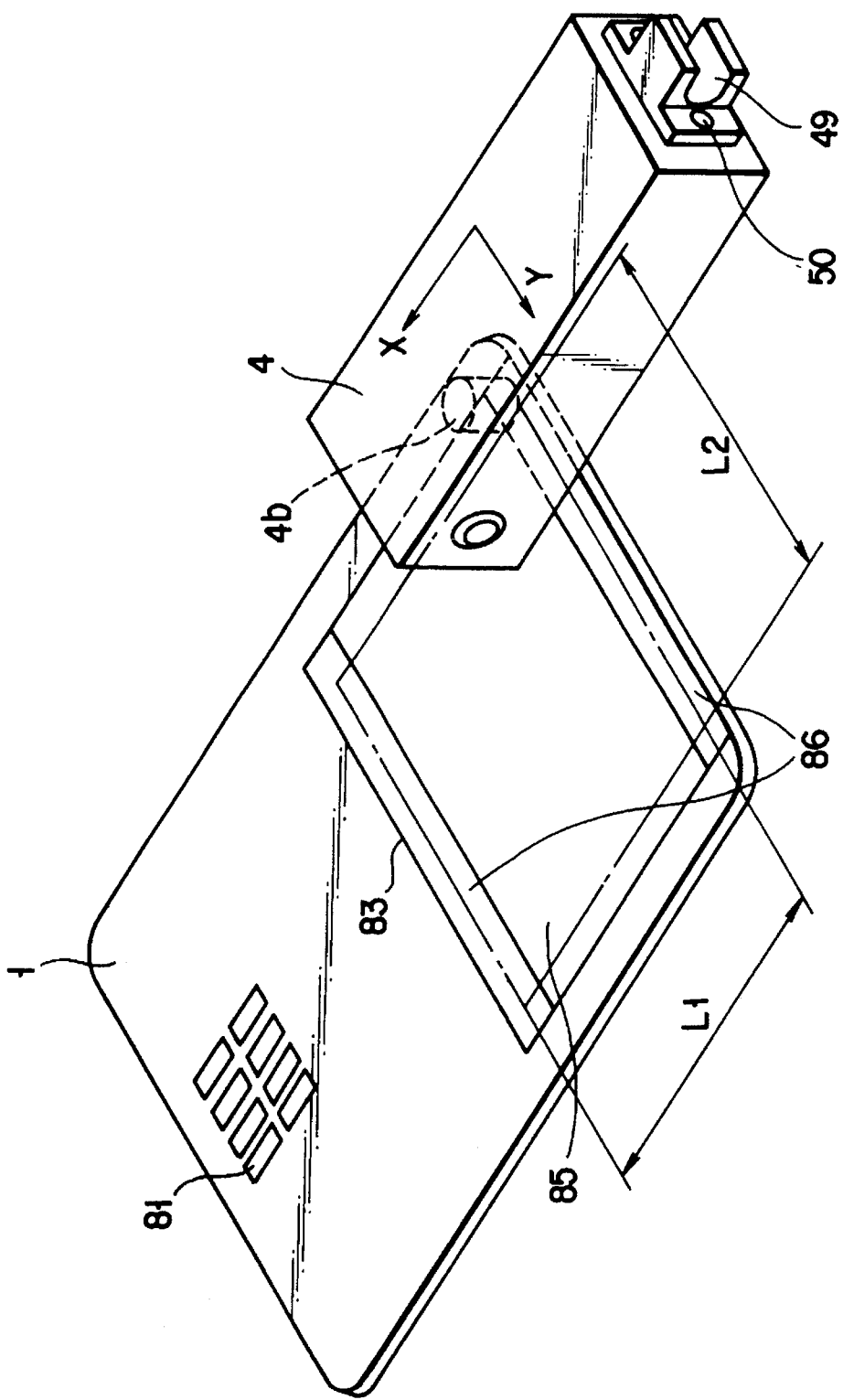
FIG. 10 is a perspective view explaining an operation of an optical head to the hybrid card.

According to the above-mentioned structure, as shown in FIG. 10, the optical head 4 is moved over an ID section 86 of an optical medium section 83 of the hybrid card 1 over a length L2 in the Y direction. Then, after stopping of the optical head 4, a track number written in the ID section 86 of a track is read, and the position of the optical head 4 can be controlled to position the optical head 4 at the desired track to be read. In a case where a data region 85 of the optical medium section 83 is to be read, the optical head 4 after being located at the desired track scans the track over length L1 in the X direction, to read the scanned track.

As shown in FIG. 9, a shutter 64 shutting the inlet of the apparatus is formed in the main body of the housing (not shown). The shutter 64 is rotatably supported by a shaft (not shown), and urged by a spring (not shown) to be moved in a counterclockwise direction shown by an arrow R3.

A scale 66 (i.e., a magnetic scale, an optical scale, etc.) is provided on the lower surface of the moving base 31. A detector 67 (magnetic, optical, etc.) is provided in the frame 7 (FIG. 4) so as to read the scale 66. By the scale 66 and the detector 67, the position of the moving base 31 and the speed are detected, and the change of the speed is controlled. According to the above-mentioned structure, the speed of the moving base 31 at the time of moving in the X direction is stabilized, and any influence which is exerted on the characteristic of the recording/reproducing to/from the optical medium section 83 is lessened.

As shown in FIG. 3, a terminal holder 6 is arranged on the side of the top end portion of the hybrid card 1 mounted on the mounting position. As shown in FIG. 12B, the terminal holder 6 has an arm 6b and a stand-up portion 6c. A plurality of contact terminals 6a are formed in the arm 66 which is supported by the stand-up portion. The arm 66 and the portion 6c are orthogonal each other.

The proximal end of the arm 6b, has a through hole therein where the shaft 62 is inserted. The terminal holder 6 is freely rotated by the shaft 62. The shaft 62 is fixed to a fixing member (not shown) attached to the frame 7.

One end portion of a holder spring 63 comprising a pressing spring is connected to a stand-up portion 7b of the frame 7b. The other end portion of the holder spring 63 is connected to the stand-up portion 6c of the terminal holder 6. Thereby, the terminal holder 6 is urged to be moved in a clockwise direction (direction of arrow R1) as shown in FIG. 12A.

An operation of the above-mentioned embodiment will be explained. In order to simplify the explanation, a "hybrid card" is hereinafter called "card" in this explanation. According to the present invention, data reading from the data section 85 of the card 1 is performed in a manner of a parallel transmission for 8-bits.

The loading operation of the card will be explained. If the card is inserted to the apparatus from the card inlet (not shown), the insertion of the card 1 is detected by the sensor 8 shown in FIG. 5. Then, the loading motor 9 is driven by a controller 10 (not shown), and its driving force is transmitted to the shaft 12A via the worm gear 11 and the gear 13. If the shaft 12A is rotated, two loading rollers 16A rotate with the shaft 12A. Then, the loading rollers 16A and the roller 16 lead the card 1 to the inside of the apparatus.

Figure 11A:
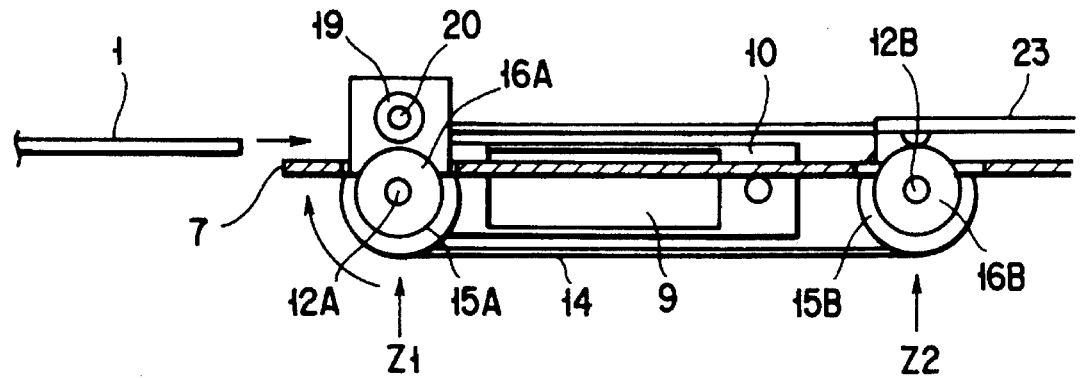
FIGS. 11A to 11D are side views, which are partially broken, explaining an operation of a loading mechanism.

As shown in FIG. 11A, before the card 1 is inserted, the loading roller 16A is urged to be moved upward, that is, in the Z1 direction, and a transferring roller 16B is urged to be moved to the side of the guide 23, that is, in the Z2 direction.

Figure 11B:
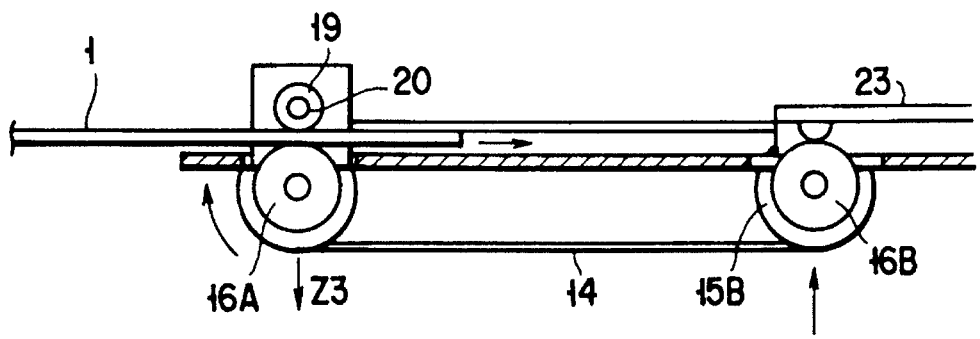

As shown in FIG. 11B, if the card 1 is inserted into the backward portion of the apparatus, the loading roller 16B is moved down, that is, in the Z3 direction, against the force of the springs 18A (see FIG. 6). At the same time, the shaft 12A is also moved in the Z3 direction. However, since the distance between the worm gear 11 and the gear 13 on the shaft is maintained constant, the motor plate 10 having the loading motor 9 is rotated around the shaft (not shown).

If the card 1 is further inserted, the transfer roller 16B is moved down, that is, in the Z4 direction, against the spring 18B (see FIG. 6), and the card 1 is introduced into the groove of the guide 23 and transferred along the groove. If the card 1 is passed through the loading roller 16A, the loading roller 16 is moved upward again.

Figure 11C:
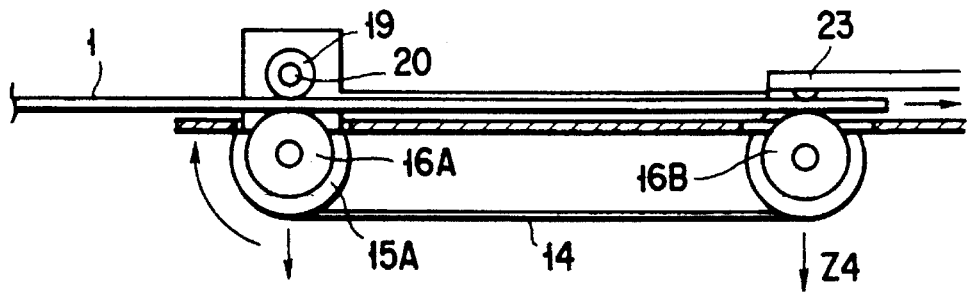
Figure 11D:
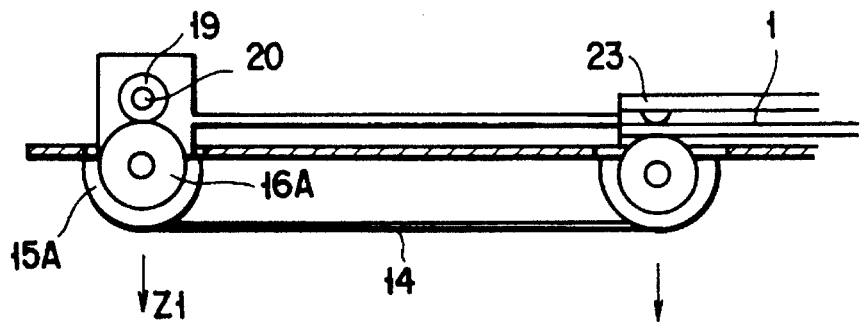

Then, if the card 1 is further transferred, the card 1 contacts the stoppers 23a and 24a formed on the guides 23 and 24 shown in FIG. 7 and reaches the mounting position, and the loading of the card 1 is finished as shown in FIG. 11C. The contact between the transfer roller 16B and the card 1 is always maintained even if the loading of the card 1 is finished.

while the card 1 is being transferred along the groove of the guide 23, the card 1 is urged to be moved to the direction of the guide 24 by two pressing levers 25 and 26 as shown in FIG. 7.

The following is the explanation of the state in which the IC terminal 81 and the contact terminal 6a of the terminal contact 6 are electrically connected to each other. Under the state before the card 1 reaches fully loaded position the terminal holder 6 is inclined to the direction of an arrow R1 by a force of the holder spring 63 as shown in FIG. 12B. This state is maintained until the card 1 contacts the stand-up portion 6c.

If the card 1 contacts the stand-up portion 6c, the terminal holder 6 rotates in a direction of an arrow R2 against the force of the holder spring 63 as shown in FIG. 12B, and the contact terminal 6a electrically contacts the IC terminal 81 simultaneously with the arrival of the card 1 at the mounting position. This electrical contact makes it possible to perform the recording/reproducing operation to/from the IC chip.

The operation of the optical head will now be explained.

If the motor 57 for the optical head is started as shown in FIG. 8, the lead screw 53 rotates via the worm gear 58 and the gear 55. By the rotation of the lead screw 53, the pin 52 which is engaged with the screw of the lead screw 52 is moved in a direction perpendicular to the sheet of paper. In accordance with this movement, the optical head 4 is moved in the Y direction shown in FIG. 8. Therefore, the optical medium section 83 (see FIG. 10) can be scanned over the length L2, the track number written in the ID section 86 is read, and the optical head 4 can be controlled.

Figure 13:
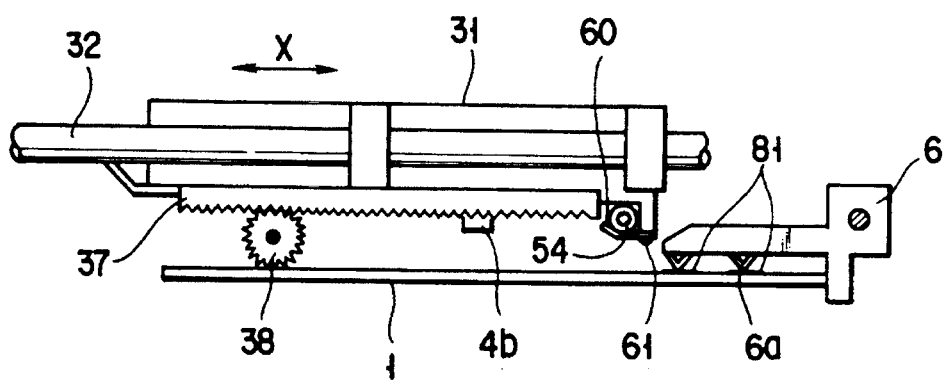
FIG. 13 is a side view showing a moving base when a recording/reproducing operation is performed in an optical recording region.

If the motor 41 (FIG. 4) is started, the power of the motor 41 is transmitted to the pinion 38 via two gears 42 and 39. If the pinion 38 is rotated, the pinion and the rack 37 are engaged with each other as shown in FIG. 13, so that the moving base 31 is moved in the X direction.

By this operation, the optical head 4 is moved in the X direction together with the moving base 31. Due to this, the data section 38 of the optical medium section 83 of FIG. 10 can be scanned over the length L1. Moreover, the objective lens 4b can be moved up to the position where the object lens 4b is opposite to the ID region 86.

The ejection of the card 1 can be attained by performing the opposite operation to the loading operation. That is, the operations shown in FIGS. 11A to 11D are sequentially performed so that ejection of the card can be attained.

An operation of the shutter 64 shown in FIG. 9 will now be explained.

If the moving base 31 exceeds the range of the reciprocating motion which is along the X direction, and moves toward the side of the inlet, a shutter lever 65 attached to the moving base 31 comes in contact with the arcoate surface of one end portion of the shutter 64. By this contact, the lever functions to rotate the shutter 64 against the spring force (not shown) in the direction opposite to the direction of the arrow R3. Due to this, the inlet of the apparatus is opened, and the insertion and ejection of the card 1 can be attained.

According to the present invention, data reading from the data section 85 of the card 1 is performed in a manner of a parallel transmission for 8-bits. Due to this, the relative speed between the card 1 and the optical head 4 is ⅛ of a serial transmission. Therefore, even in a case where the optical head 4 is two-dimensionally moved as explained in the above embodiment, there is little load on the driving system.

However, the method of data transmission of the present invention is not limited to the 8-bit parallel transmission.

According to the present invention, the IC terminal 81 and the optical medium section 83 are spaced apart in a direction parallel to the recording tracks 84. Due to this, interference with the terminal holder 6 contacting the IC terminal 81 and the optical head 4 scanning the optical medium section 83 can be prevented. Also, the optical medium section 83 can be scanned as the contact between the IC terminal 81 and the terminal holder 6 is maintained as it is.

As mentioned above, since the IC terminal 81 and the optical medium section 83 are spaced apart along the extending direction of the recording tracks 84, there can be provided a small-sized hybrid card in which recording/reproducing can be performed. Moreover, since the hybrid card 1 has the optical medium section 83 and the IC chip 89, the advantage of the recording medium and that of the IC chip can be provided at the same time.

Figure 14:
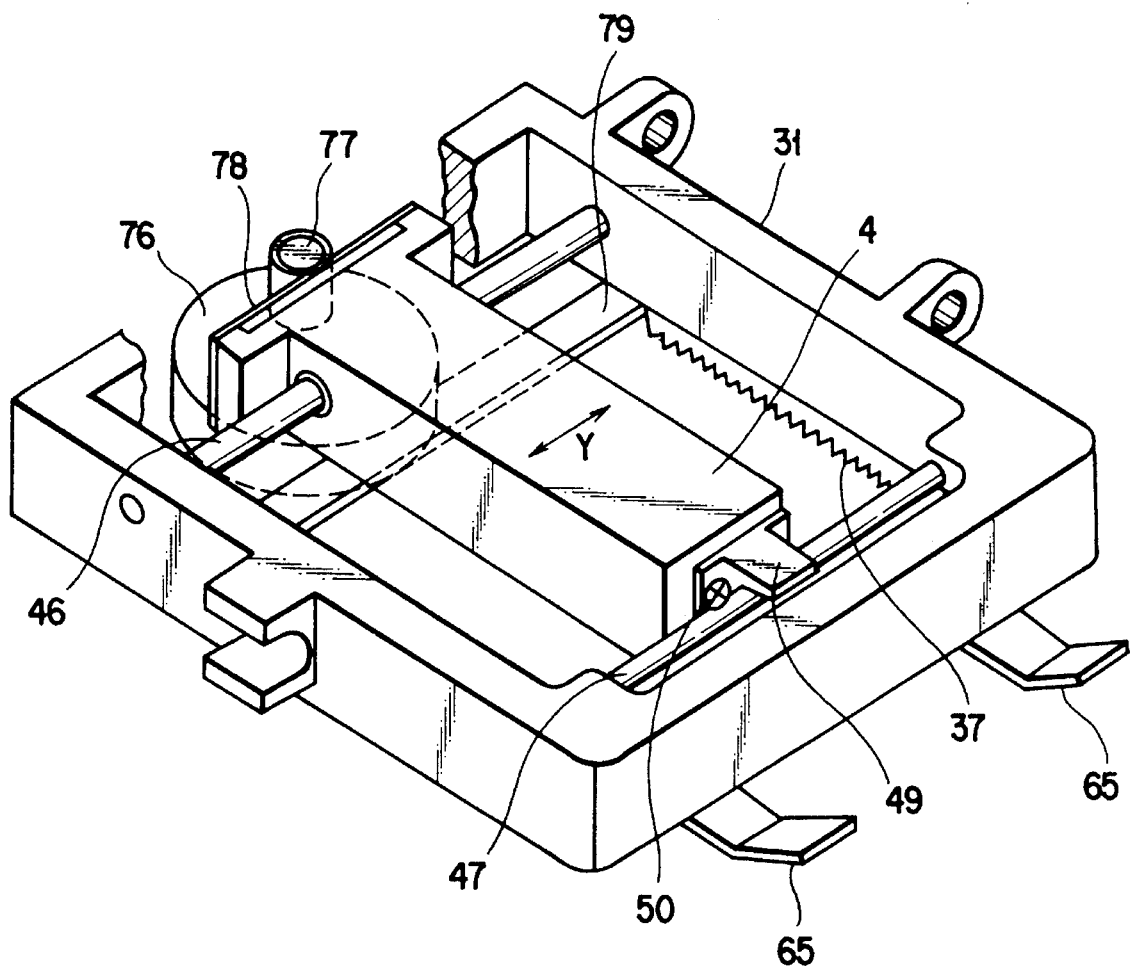
FIG. 14 is a perspective view showing a first modification of the apparatus.

A modification of the moving mechanism of the optical head 4 will be explained with reference to FIG. 14.

In the above embodiment, the lead screw 53 is used as moving means for the optical head 4. However, the following structure may be used.

That is, a steel belt 78 having a thickness of 20 to 30 μm is wound around a pulley 77, which is attached to the rotation shaft of a motor 76, in an a manner, and this may be used as means for driving the optical head 4 in a Y direction (generally called as an a belt system). According to this modification, the type of the motor 76 is a stepping motor, and the positioning control of the optical head does not have to be particularly performed if the feeding pitch of the stepping motor and that of the optical head 4 are set to an integer ratio. Thereby, the feeding accuracy can be ensured. In a case where the type of the motor 76 is a normal DC brush motor, a scale 79 (magnetic and optical) is provided in the moving base 31 and the detector is provided in the optical head 4, whereby the positioning control can be performed.

Figure 15:
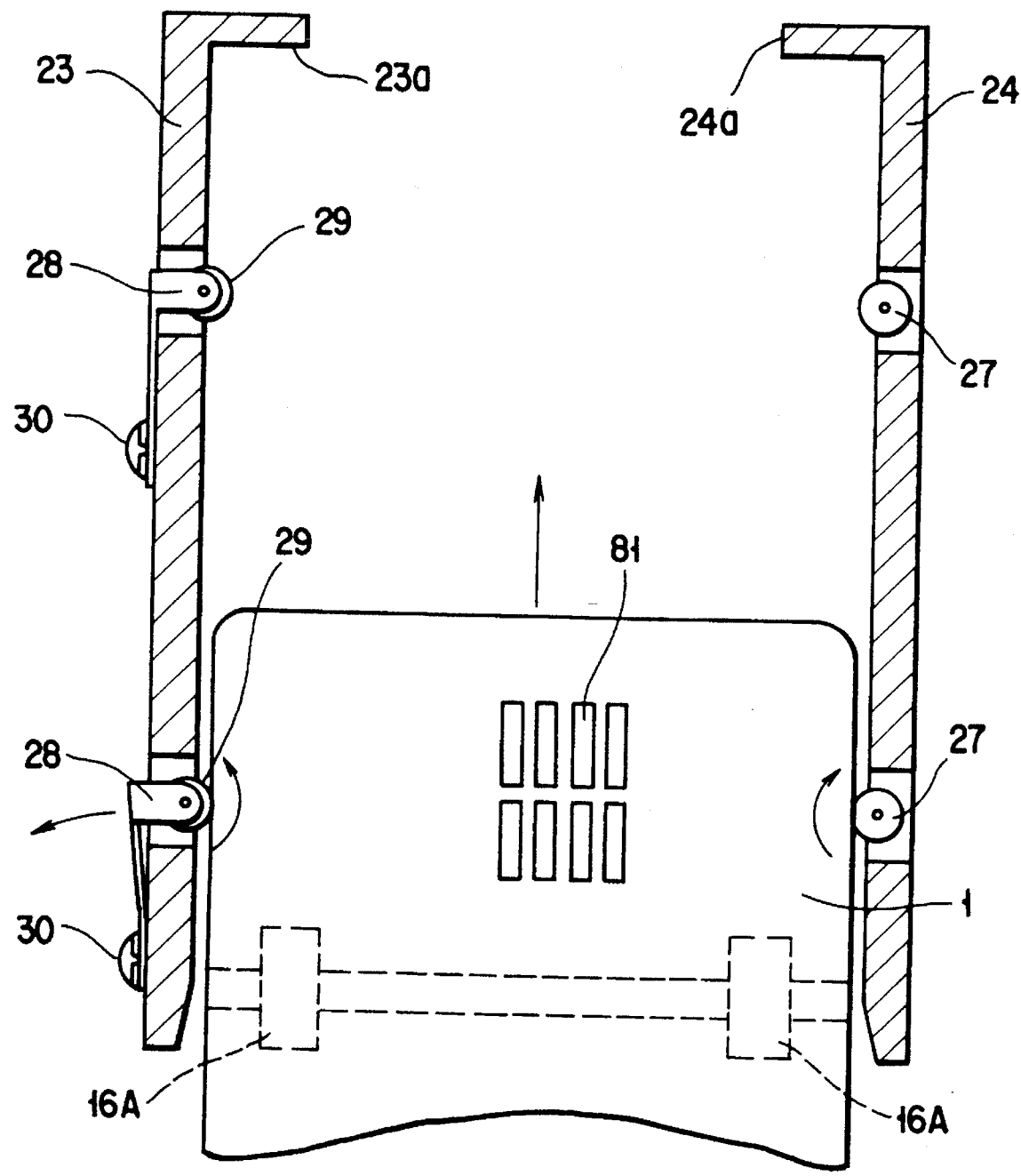
FIG. 15 is a perspective view showing a second modification of the apparatus.

A modification of the guides 23 and 24 will be explained with reference to FIG. 15.

Two reference rollers 27 are rotatably provided around an axis which is perpendicular to the guide 24. Two plate springs 28 are provided in the guide 23. The roller 29 is rotatably supported at one end of the plate spring 28. The other end of the plate spring 28 is secured to the guide 23 by the screw 30. Two rollers 29 project to the transferring passage of the card 1, and the card 1 is pressed by a force of the plate spring 28.

A modification of the optical medium section 83 of the hybrid card 1 will be explained with reference to FIG. 16.

This modification is the same as the above embodiment in that the contact region 82 is ensured. The optical medium section 83 is extended in the longitudinal direction of the card substrate 80 up to the margin region other than the contact region 82, that is, the upper region of the contact region 82. In order to read data of the above-structured data recording card, the length of the predetermined recording track 84 is recognized by the ID section 86, and the driving region of the card and the reading circuit are controlled.

As shown in FIG. 17, the optical medium section 83 and the IC terminal 81 may be separately formed. The optical medium 83 is on the first surface 80a while the IC terminal 81 is on the second surface 80b. In order to use the card 1, the apparatus only needs to turn the terminal holder 6, shown in FIGS. 12A and 12B, upside down.

If the hybrid card is structured as shown in FIGS. 16 and 17, the recording capacity of the optical medium section 83 can be increased to be larger than that of the above-mentioned embodiment.

Figure 18:
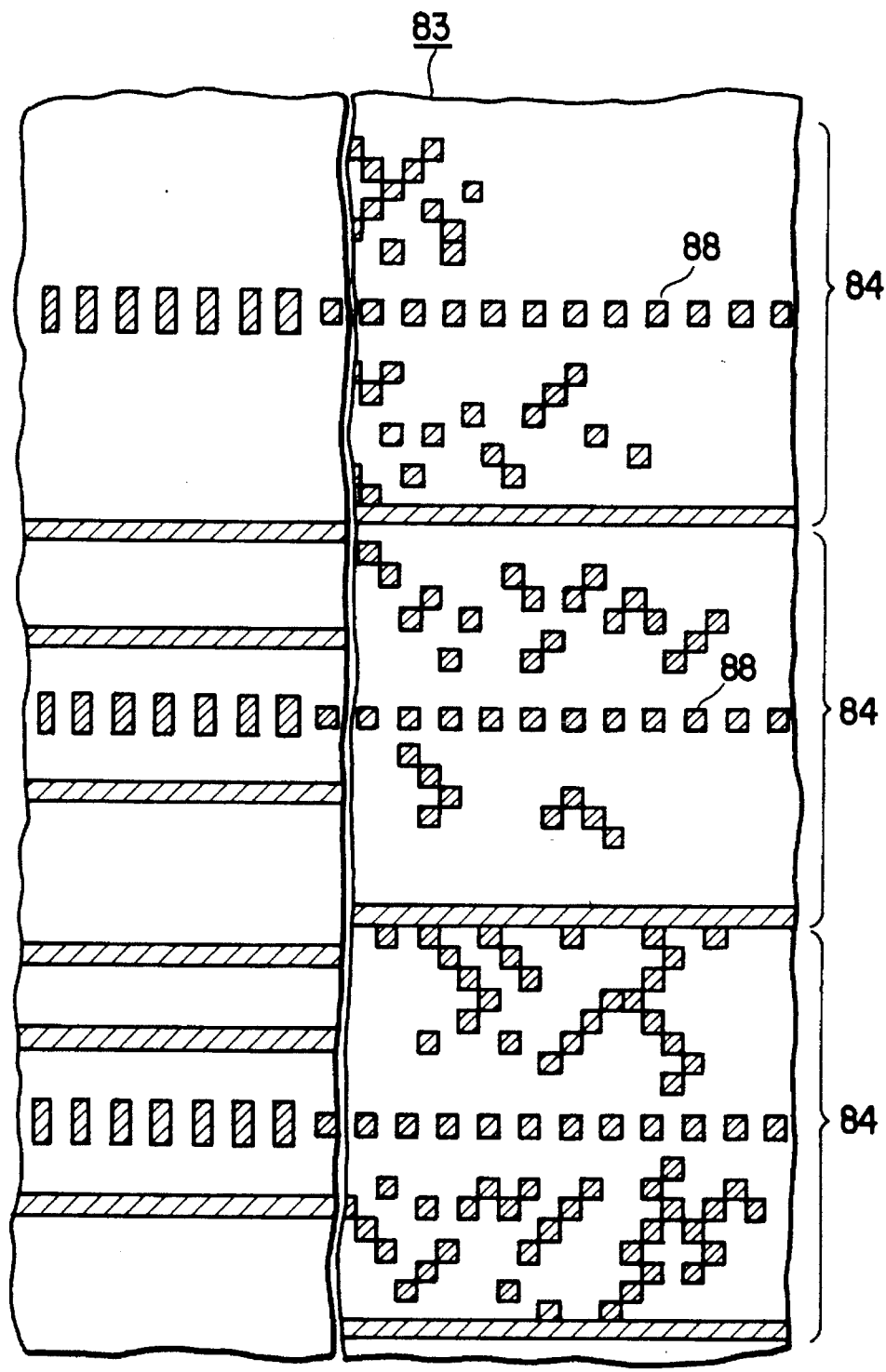
FIG. 18 is an enlarged plan view showing a modification of the optical recording region.
Figure 19:
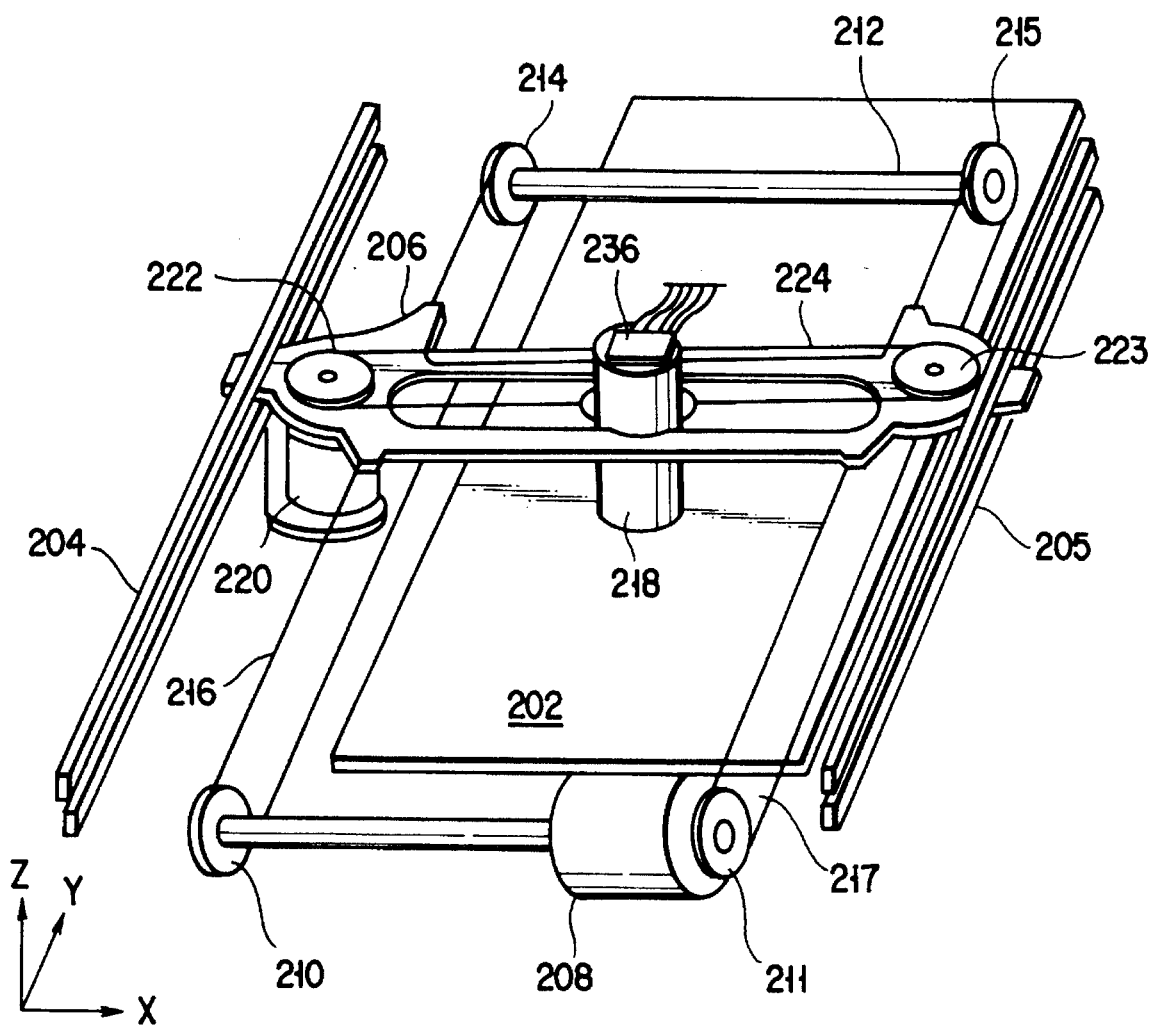
FIG. 19 is a perspective view showing a conventional recording/reproducing apparatus.
Figure 20:
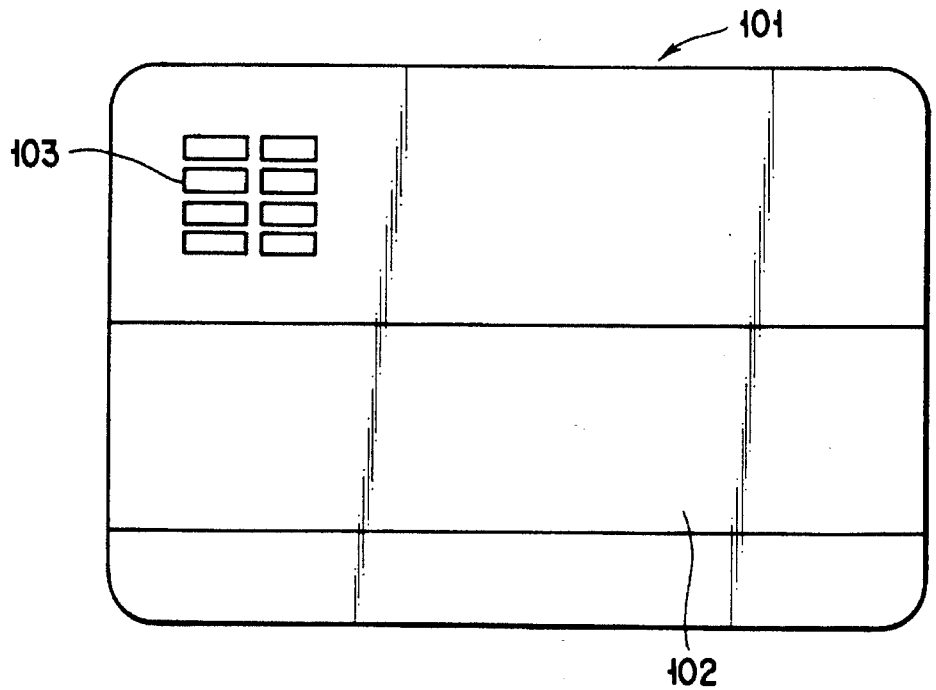
FIG. 20 is a plan view showing a prior art hybrid card.
Figure 21:
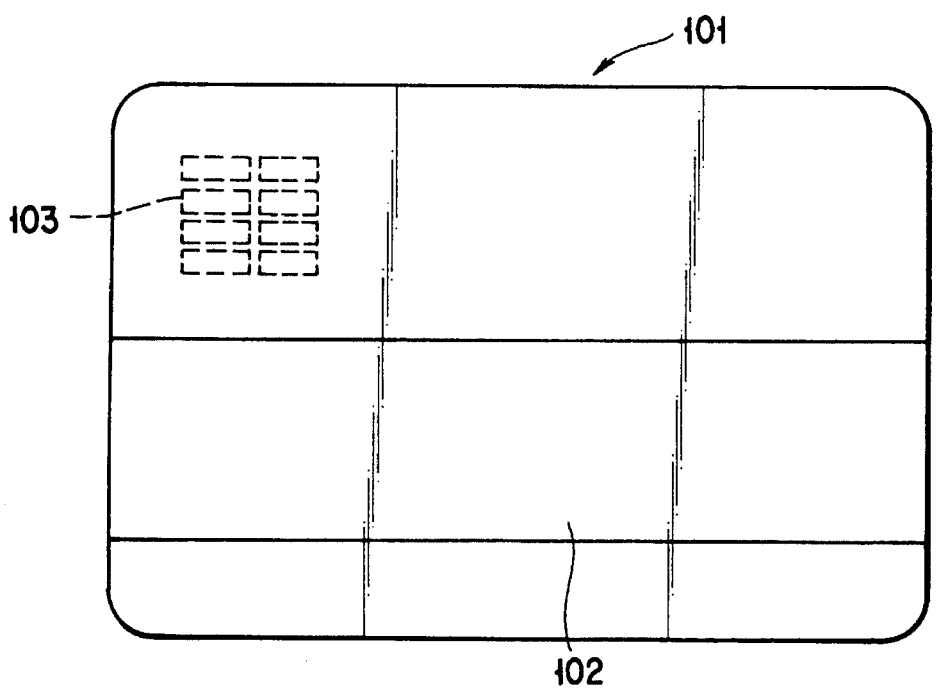
FIG. 21 is a plan view showing a prior art hybrid card of another type.
Figure 22:
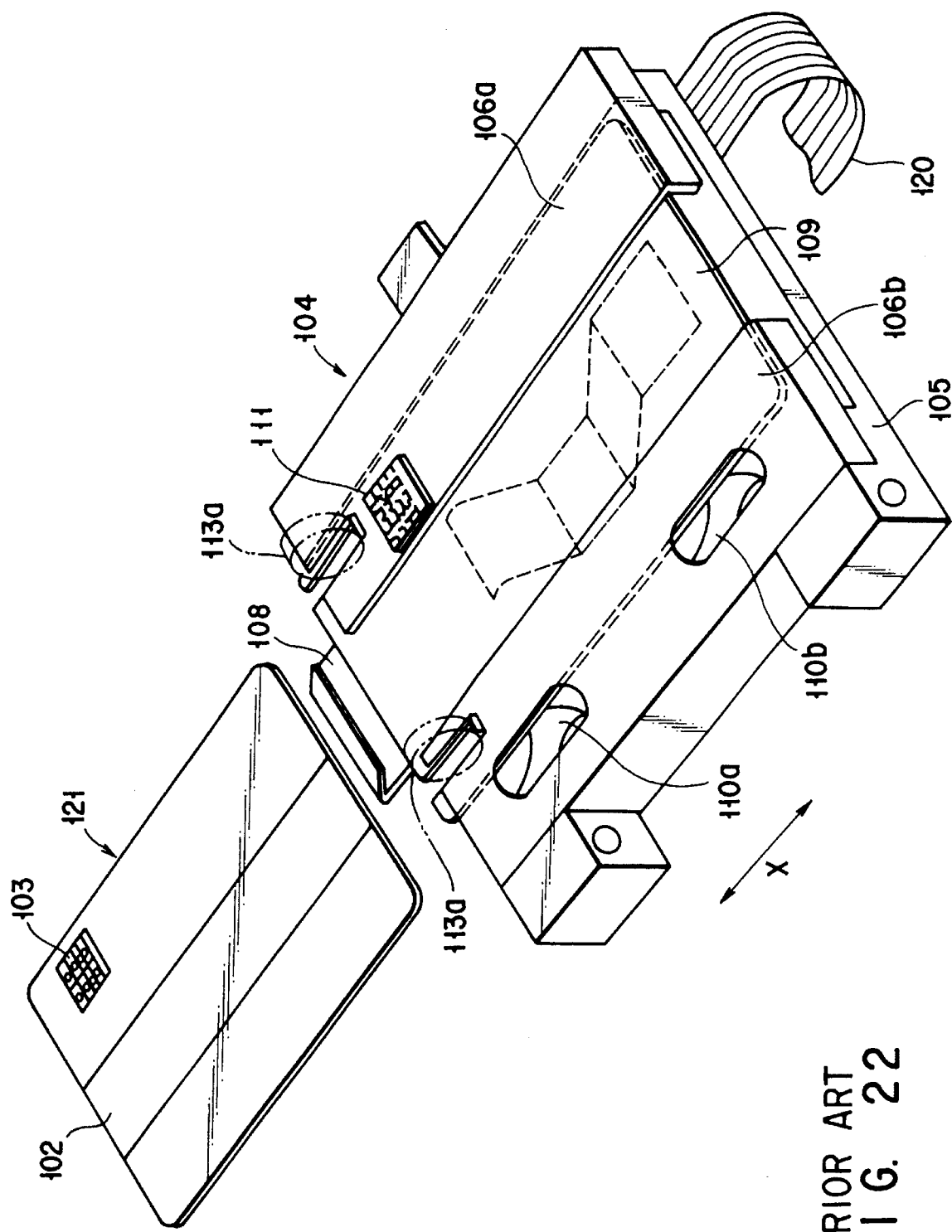
FIG. 22 is a perspective view showing a shuttle of a general prior art recording/reproducing apparatus.
Figure 23:
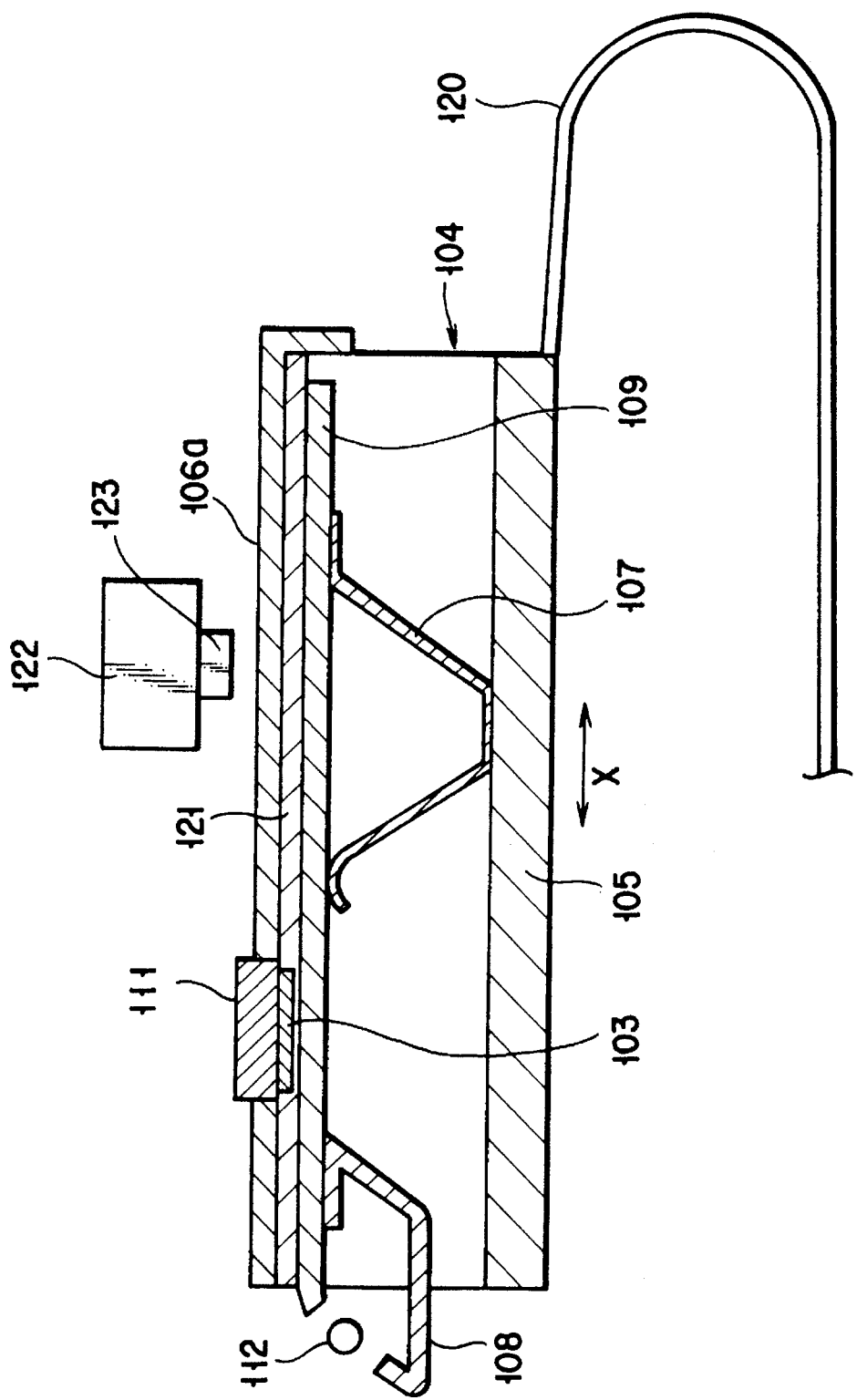
FIG. 23 is a vertical cross-sectional view of the prior art apparatus of FIG. 22.

Furthermore, as shown in FIG. 18, a clock signal generating track 88 may be provided in the optical medium section 83 (the track 88 is disclosed in Published Unexamined Japanese Patent Application No. 63-197067 by the same applicant as the present case). In the application that the recording/reproducing is performed to be synchronized with the clock signal generated by the track 88, a speed variation can be allowed to some extent. Due to this, the scale 66 shown in FIG. 9 and the detector 67 are not needed.

The above embodiment and the modifications explained the hybrid card having an optical recording region. However, the hybrid card having a magnetic recording region, or the hybrid card having both of the optical recording region and the magnetic recording region may be used. Moreover, the above embodiment and the modifications explained the data section 85 of the recording track 84 to which data is already written. However, it is possible to use a data section to which data is written later.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A hybrid card comprising:
   a substrate having a first surface and a second surface opposite to the first surface;
   an IC chip mounted in the substrate;
   at least one IC terminal electrically connected to the IC chip and arranged on only one of the first and second surfaces; and
   an optical recording region having a plurality of tracks extending parallel to each other, the recording region being on only one of the first and second surfaces, and
   wherein said at least one IC terminal and said optical recording region are spaced from each other along the extending direction of the tracks, to thereby provide a space in said extending direction between said recording region and said at least one IC terminal.

2. A hybrid card according to claim 1, wherein said at least one IC terminal and said recording region are both formed on only said first surface.

3. A hybrid card according to claim 2, wherein said recording region has a track for generating a clock signal.

4. A hybrid card according to claim 3, wherein said card is substantially rectangular in shape, and wherein said tracks of said recording region extend in the longer direction of said substantially rectangular card.

5. A hybrid card according to claim 2, wherein said card is substantially rectangular in shape, and wherein said tracks of said recording region extend in the longer direction of said substantially rectangular card.

6. A hybrid card according to claim 1, wherein said recording region is formed on only the first surface and said at least one IC terminal is formed on only the second surface.

7. A hybrid card according to claim 6, wherein said card is substantially rectangular in shape, and wherein said tracks of said recording region extend in the longer direction of said substantially rectangular card.

8. A hybrid card according to claim 1, wherein said card is substantially rectangular in shape, and wherein said tracks of said recording region extend in the longer direction of said substantially rectangular card.

* * * * *